(12) United States Patent
Mosher et al.

(10) Patent No.: US 11,522,305 B2
(45) Date of Patent: Dec. 6, 2022

(54) FRANGIBLE SHUNT LINK AND ASSEMBLY

(71) Applicant: TransTech of South Carolina, Inc., Piedmont, SC (US)

(72) Inventors: Joseph Mosher, Saint Paul, MN (US); William Golpe, Taylors, SC (US); Stacy Neil Smith, Piedmont, SC (US)

(73) Assignee: TRANSTECH OF SOUTH CAROLINA, INC., Piedmont, SC (US)

( * ) Notice: Subject to any disclaimer, the term of this patent is extended or adjusted under 35 U.S.C. 154(b) by 503 days.

(21) Appl. No.: 16/696,745

(22) Filed: Nov. 26, 2019

(65) Prior Publication Data

US 2020/0176901 A1    Jun. 4, 2020

Related U.S. Application Data

(60) Provisional application No. 62/773,569, filed on Nov. 30, 2018.

(51) Int. Cl.
| | |
|---|---|
| *H01R 11/01* | (2006.01) |
| *H01R 41/00* | (2006.01) |
| *H01H 85/20* | (2006.01) |
| *B60L 5/20* | (2006.01) |
| *H01R 4/50* | (2006.01) |

(52) U.S. Cl.
CPC ............ *H01R 11/01* (2013.01); *B60L 5/20* (2013.01); *H01H 85/205* (2013.01); *H01R 4/5091* (2013.01); *H01R 41/00* (2013.01); *H01R 2201/26* (2013.01)

(58) Field of Classification Search
CPC ...... H01R 11/01; H01R 4/5091; H01R 41/00; H01R 2201/26; H01R 13/621; H01R 13/6215; B60L 5/20; B60L 5/39; B60L 3/04; H01H 85/205
USPC .................................................. 439/163, 475
See application file for complete search history.

(56) References Cited

U.S. PATENT DOCUMENTS

| | | | | |
|---|---|---|---|---|
| 2,161,100 | A * | 6/1939 | Sierk .................. | B60L 5/38 |
| | | | | 191/49 |
| 7,070,417 | B2 * | 7/2006 | Meleck .............. | H01R 13/6271 |
| | | | | 439/163 |
| 8,839,921 | B2 * | 9/2014 | Sommer ............ | B60L 5/08 |
| | | | | 191/49 |
| 9,630,507 | B2 * | 4/2017 | Zhang ................ | B61F 5/26 |

\* cited by examiner

*Primary Examiner* — Oscar C Jimenez
*Assistant Examiner* — Paul D Baillargeon
(74) *Attorney, Agent, or Firm* — The Small Patent Law Group LLC; Christopher R. Carroll (57) ABSTRACT

A frangible shunt link assembly includes a frangible link configured to conductively couple a current collector coupled with a vehicle and one or more components of the vehicle. The frangible link is configured to break responsive to the current collector being at least partially separated from the vehicle to interrupt a conductive connection between the current collector and the one or more components of the vehicle.

20 Claims, 9 Drawing Sheets

FRANGIBLE SHUNT LINK AND ASSEMBLY

CROSS-REFERENCE TO RELATED APPLICATIONS

This application claims priority to U.S. Provisional Application No. 62/773,569, which was filed on 30 Nov. 2018, and the entire disclosure of which is incorporated herein by reference.

BACKGROUND

Technical Field

The subject matter described herein relates to assemblies that protect electronic components and personnel when there is a structural or mechanical failure of an electrically powered system.

Discussion of Art

Electrically powered vehicles, such as transit railcars operated by municipal light rail and subway services, may include a collector shoe assembly positioned at the bottom of the railcar that engages an electrified rail running alongside the main transit rails of the line. The collector shoe assembly includes a paddle or shoe that is lowered to engage the electrified rail and place the railcar's electrical power system in connection with the electrified rail for transmission of electrical power from the electrified rail to the railcar.

The collector shoe assembly is mechanically and structurally connected to the railcar and electrically coupled to the railcar's electrical system by a hard-wired connection to a fuse assembly. In the event of a mechanical/structural failure of the collector shoe assembly, the collector shoe assembly or portions of the collector shoe assembly, such as the paddle or shoe, can become structurally disconnected from the railcar but remain tethered to the railcar via the hard-wired connection leading to the broken portions of the collector shoe assembly being dragged from the bottom of the railcar. The dragging of the broken portions of the collector shoe assembly from the railcar is likely to result in damage to or loss of the more expensive fuse assembly, as well as possibly result in damage to the railcar truck

BRIEF DESCRIPTION

In one example, a frangible shunt link assembly is provided that includes a current collector configured to be coupled with a vehicle and to engage a conductive pathway of a route on which the vehicle is moving. The current collector is configured to receive electric current from the conductive pathway. The assembly also includes a frangible link attached to the current collector and configured to be coupled with a fuse assembly of the vehicle to establish a conductive connection between the current collector and the fuse assembly. The frangible link is configured to break and interrupt the conductive connection between the current collector and the fuse assembly.

In another example, a vehicle includes the frangible shunt link assembly with the fuse assembly mounted to an external surface of the vehicle, and the frangible link coupled with the fuse assembly and the current collector.

In another example of a frangible shunt link assembly, the assembly includes a current collector configured to be coupled with a vehicle and to engage a conductive pathway of a route on which the vehicle is moving. The current collector is configured to receive electric current from the conductive pathway. The assembly also includes a frangible link attached to the current collector and configured to be coupled with one or more components of the vehicle. The frangible link is configured to break and interrupt a conductive connection between the current collector and the one or more components of the vehicle.

In another example of the frangible shunt link assembly, the assembly includes a frangible link configured to conductively couple a current collector coupled with a vehicle and one or more components of the vehicle. The frangible link is configured to break responsive to the current collector being at least partially separated from the vehicle to interrupt a conductive connection between the current collector and the one or more components of the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to shunt links and shunt link assemblies that are designed to mechanically or structurally break or fail before other components of an electrically powered system. These shunt link assemblies can mechanically and/or conductively couple a current collector with one or more components of an electrically powered system. For example, the shunt link assemblies can couple a conductive shoe, brush, pantograph, or the like, that engages a conductive pathway (e.g., an electrified rail, a catenary, or the like) to conduct current through the shunt link assemblies to a fuse assembly and/or devices onboard a moving vehicle to power the device and/or vehicle. The shunt link assemblies are designed to mechanically or structurally fail (e.g., break, tear, or otherwise no longer conductively couple the system component(s) with the current collector) to prevent or lessen structural damage to the powered system (relative to the damage that would occur without the assemblies).

Figure 1:
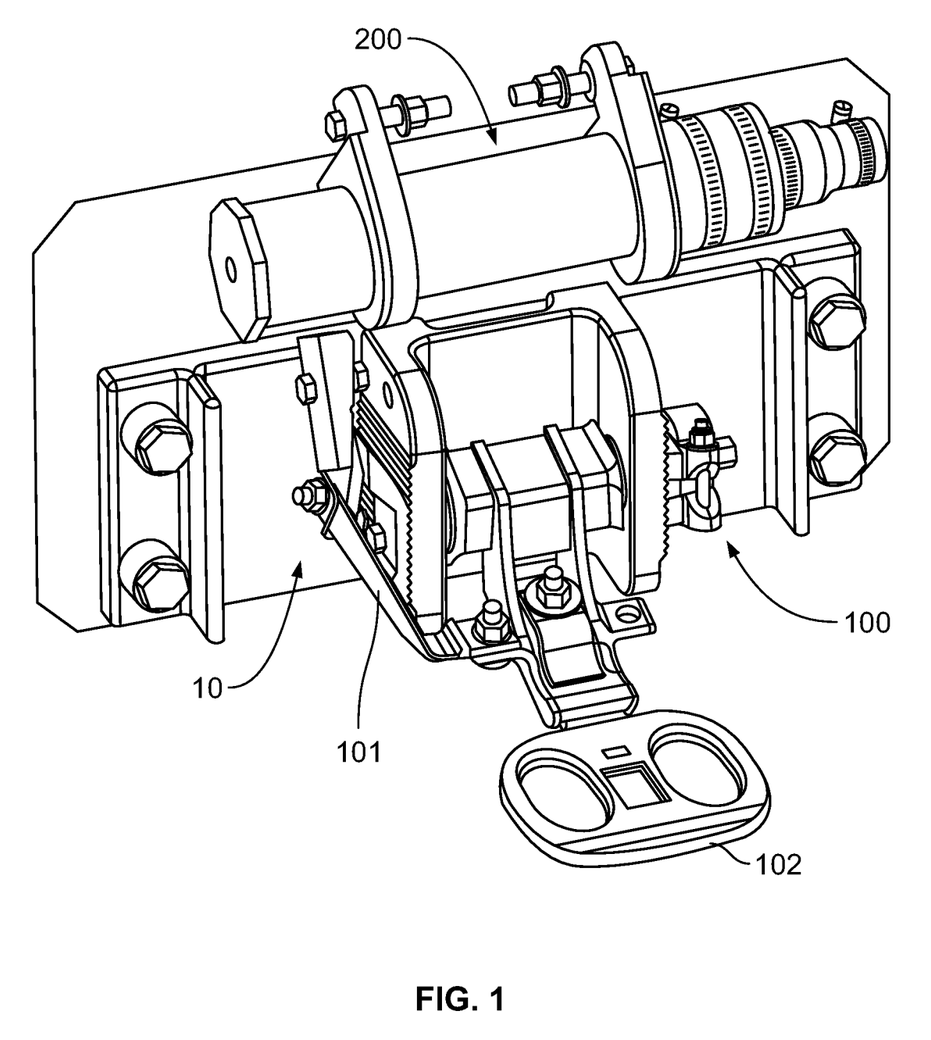
FIG. 1 is a perspective view of one example of a shunt link assembly.

FIG. 1 is a perspective view of one example of a shunt link assembly 10. The shunt link assembly is described herein as being used in connection with an electric railcar. But, not all embodiments of the shunt link assembly are limited to railcars or all-electric systems. For example, one or more embodiments of the shunt link assembly can be used with a vehicle that is entirely or only partially powered by electric current obtained from an off-board source. Optionally, at least one embodiment of the shunt link assembly may be used in connection with a stationary powered system.

In the illustrated embodiment, the shunt link assembly 10 electrically connects and communicates (e.g., conductively couples) a current collector 100 with an electronic component 200 of a powered system. The current collector is one or more conductive bodies that receive electric current from another source (e.g., an off-board source), such as an electrified rail, catenary, or the like. In the illustrated embodiment, the current collector is shown as a collector shoe of a railcar. The electronic component can be any device through which electric current is conducted to the vehicle (e.g., a fuse assembly) and/or that is powered by the electric current. In the illustrated example, the electronic component is a fuse assembly that holds one or more fuses.

The current collector may include a collector shoe or paddle 102 configured to engage an electrified conductor (e.g., an electrified rail) to transfer electric power from the rail to the powered system (e.g., the railcar) and a mechanism for raising and lowering the collector shoe or paddle into and out of engagement with the electrified conductor. The shunt link assembly includes a conductive shunt 101 that electrically connects the current collector to the shunt link assembly. The system component 200 can be a remote fuse assembly and may include a fiberglass/phonolic housing.

The shunt link assembly can be frangible so as to allow for the current collector 100 to be disconnected from the component 200 in the event of a structural or mechanical failure of the current collector. For instance, in a catastrophic event when the mounting of the current collector fails, the shunt link assembly 10 may break loose or break via a frangible link formed in the shunt link assembly 10. This can limit and possibly avoid damage to the component 200 and allow the current collector to completely break free or separate from the powered system, rather than remaining tethered and being dragged from the powered system.

The shunt link assembly 10 includes multiple parts that mate together to allow electrical power (e.g., current) to pass through the shunt link assembly 10, but will distort and break apart in the event of a mechanical or structural failure in the current collector. The shunt links described herein may break apart to protect and prevent electronic components mounted to the powered system from being pulled apart from the system in the event that the current collector is partially or entirely separated from the system.

Figure 2:
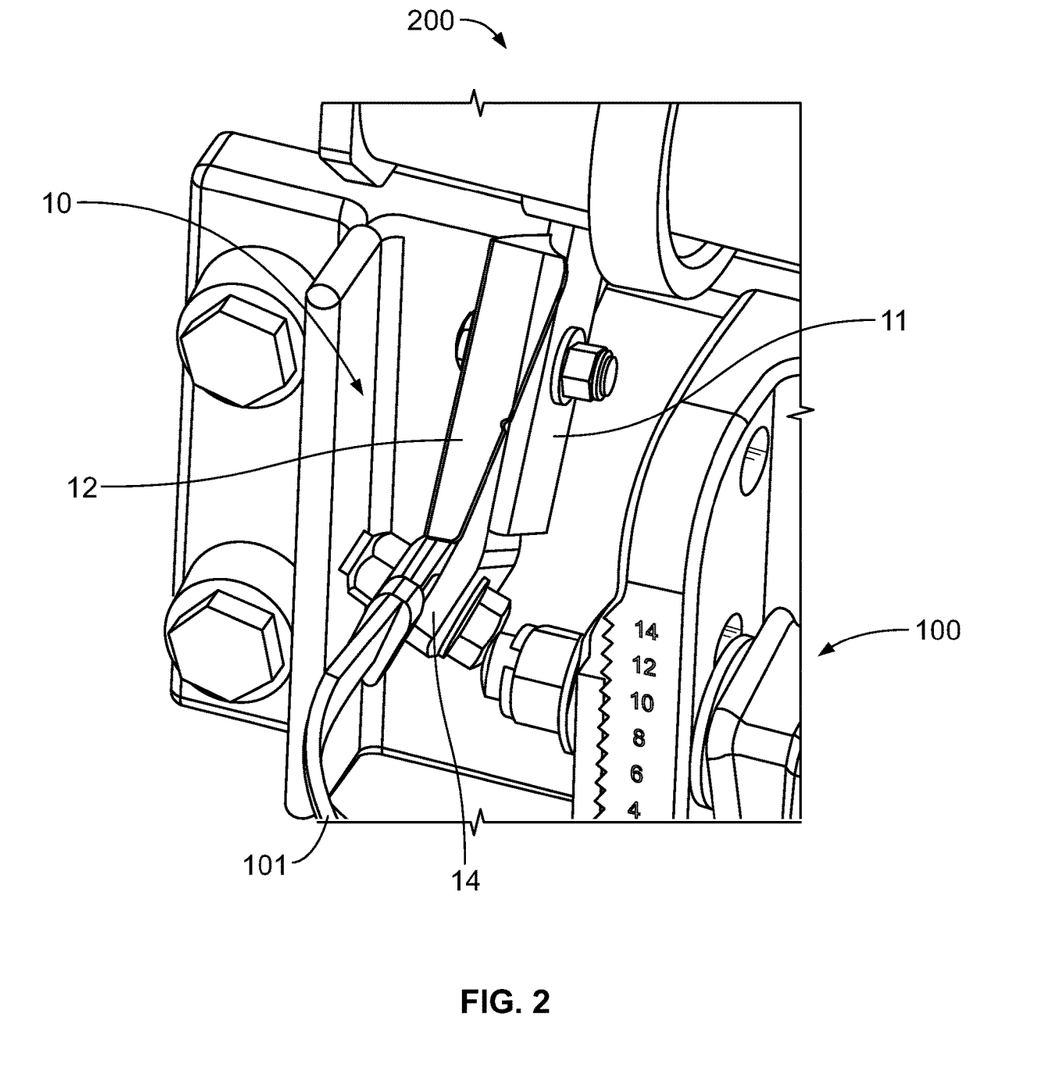
FIG. 2 is a perspective view of the shunt link assembly shown in FIG. 1.
Figure 3:
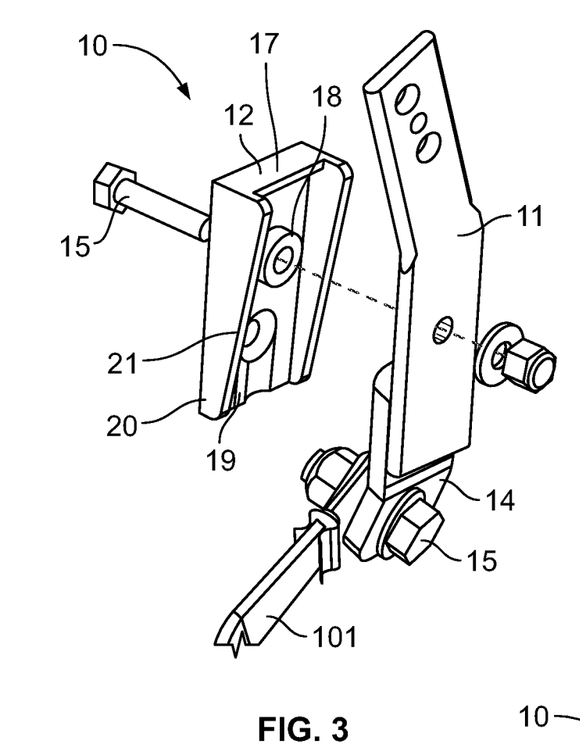
FIG. 3 is an exploded view of the shunt link assembly shown in FIG. 1.
Figure 4:
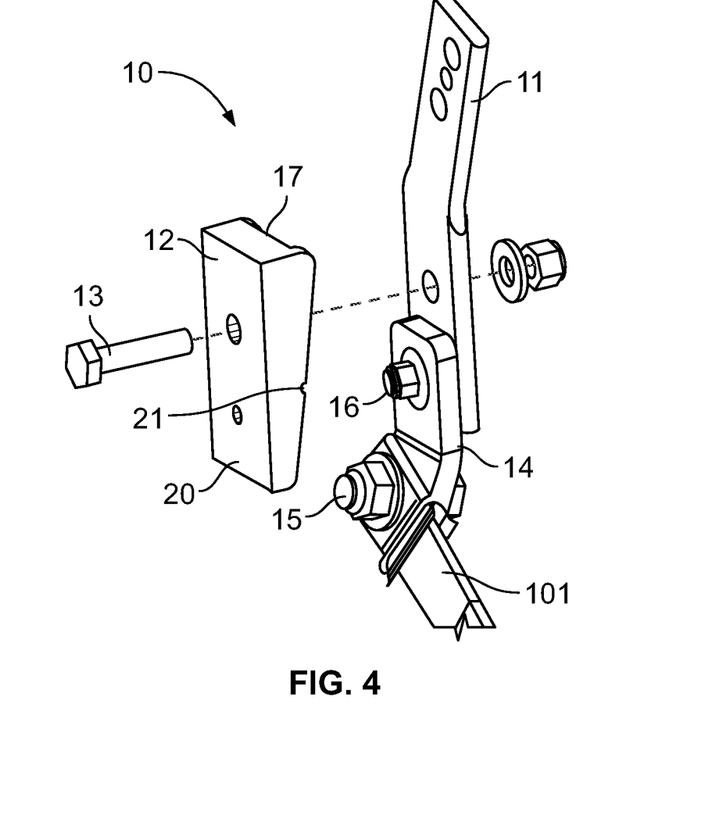
FIG. 4 is another exploded view of the shunt link assembly shown in FIG. 1.
Figure 5:
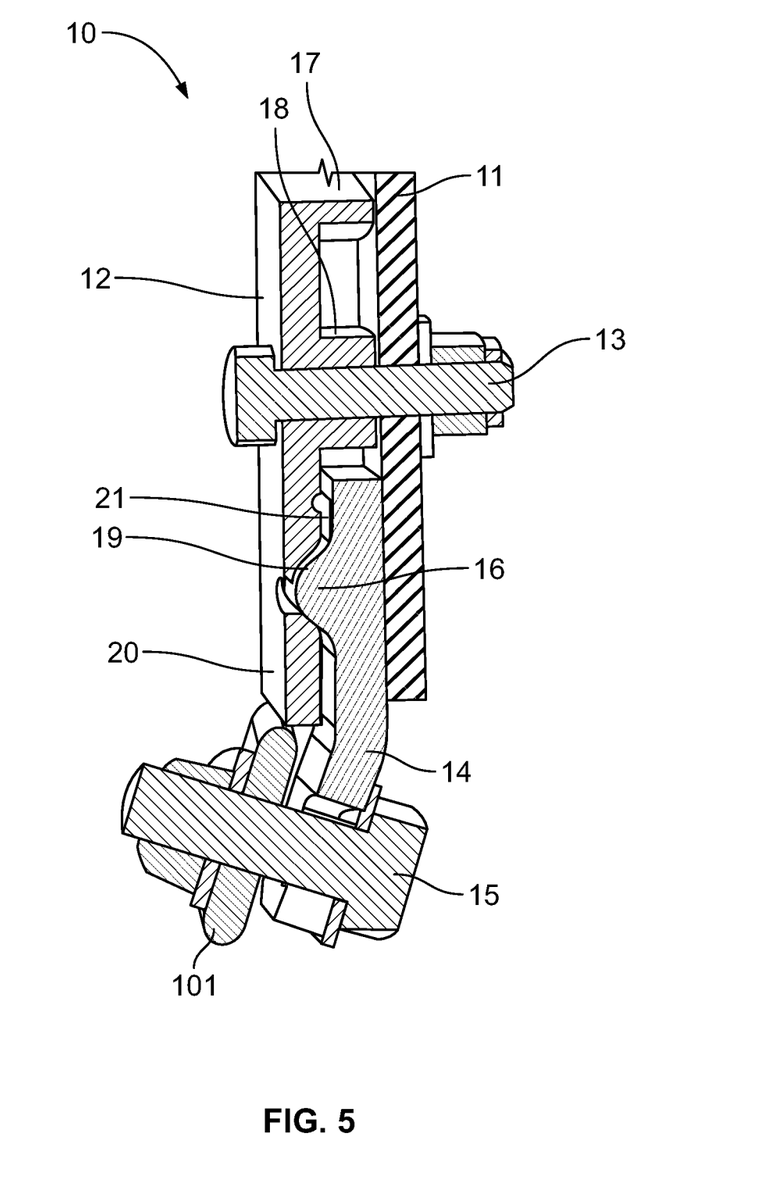
FIG. 5 is a cross-sectional view of the shunt link assembly shown in FIG. 1.

FIG. 2 is a perspective view of the shunt link assembly shown in FIG. 1. FIG. 3 is an exploded view of the shunt link assembly shown in FIG. 1. FIG. 4 is another exploded view of the shunt link assembly shown in FIG. 1. FIG. 5 is a cross-sectional view of the shunt link assembly shown in FIG. 1. The shunt link assembly includes a fuse bus bar 11 that is electrically connected (e.g., conductively coupled) to the component 200 and a shunt bus bar 14 that is electrically connected to the current collector 100 via the shunt 101. The shunt 101 can be connected to the shunt bus bar 14 by a fastener 15. The shunt link assembly 10 also can include a wedge link 12 that is connected to the fuse bus bar 11 by a fastener 13. The fuse bus bar 11 can be directly attached to the component 200 and extend into a housing of the component 200 to allow current to be conducted into the component 200. The component 200 may be mounted to an exterior surface of the powered system, such as a chassis of a vehicle. The current collector 100 also can be mounted to the same or other exterior surface of the powered system.

The shunt bus bar 14 can be held in a clamped engagement between the wedge link 12 and the fuse bus bar 11 to couple the shunt bus bar 14 to the fuse bus bar 11. This engagement can hold the shunt bus bar 14 in contact with the fuse bus bar 11 so as to place the shunt bus bar 14 and the fuse bus bar 11 in electrical communication (e.g., conductively coupled). This conductive connection electrically communicates (e.g., connects) the current collector 100 with the component 200. The wedge link 12 may include a lower deformable portion 20 that applies pressure to the shunt bus bar 14 to hold the shunt bus bar 14 against the fuse bus bar 11, which acts as a back pressure plate, in the clamped engagement. The lower deformable portion 20 of the wedge link 12 is configured to structurally deform and fail upon application of a sufficient force on the shunt bus bar 14 so as to bend away from the shunt bus bar 14 and release the shunt bus bar 14 from the clamped engagement and allow the shunt bus bar 14 to uncouple and disconnect from the fuse bus bar 11. Accordingly, in the event of a mechanical or structural failure of the current collector 100, the broken current collector 100 will pull on the shunt bus bar 14 via the shunt 101, thereby causing the deformable portion 20 of the wedge link 12 to fail and bend away to release the shunt bus bar 14 from the clamped engagement.

The wedge link 12 can include a notch or notches 21 defined therein to facilitate bending and deformation in the wedge link 12. The wedge link 12 may also include a boss 18 for receiving the fastener 13 connecting the wedge link 12 to the fuse bus bar 11. The boss 18 may have a shortened length in comparison to the thickness of the wedge link 12 so that the fastener 13 can be utilized to generate a sufficient clamping force on the wedge link 12 to hold the shunt bus bar 14 in the clamped engagement. The wedge link 12 may also define a pivot 17 that engages the fuse bus bar 11 in a manner that facilitates the clamping engagement of the shunt bus bar 14 between the wedge link 12 and the fuse bus bar 11.

The shunt bus bar 14 can include a detent 16 defined on a surface thereof, and the wedge link can include a detent receiver 19 defined in the deformable portion 20. The detent receiver 19 of the wedge link 12 is configured to receive the detent 16 on the shunt bus bar 14. The detent 16 on the shunt bus bar 14 and the detent receiver 19 on the wedge link 12 are configured to engage each other to limit or prevent the possibility that vibration within the shunt link assembly 10 will cause the shunt bus bar 14 to become loosened and slide away from the fuse bus bar 11. When the deformable portion 20 fails and bends away from the shunt bus bar 14, the detent 16 will disengage and fall out of the detent receiver 19.

Figure 6:
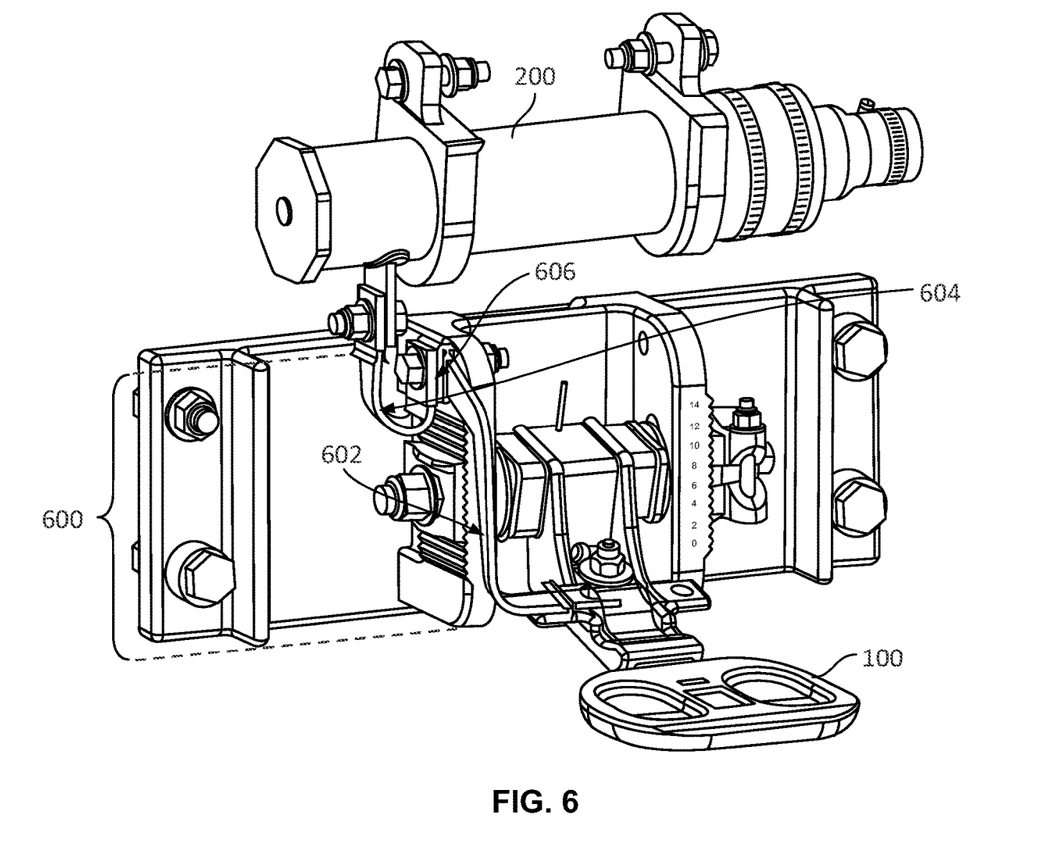
FIG. 6 illustrates a perspective view of another example of a shunt link assembly mounted to a powered system.
Figure 7:
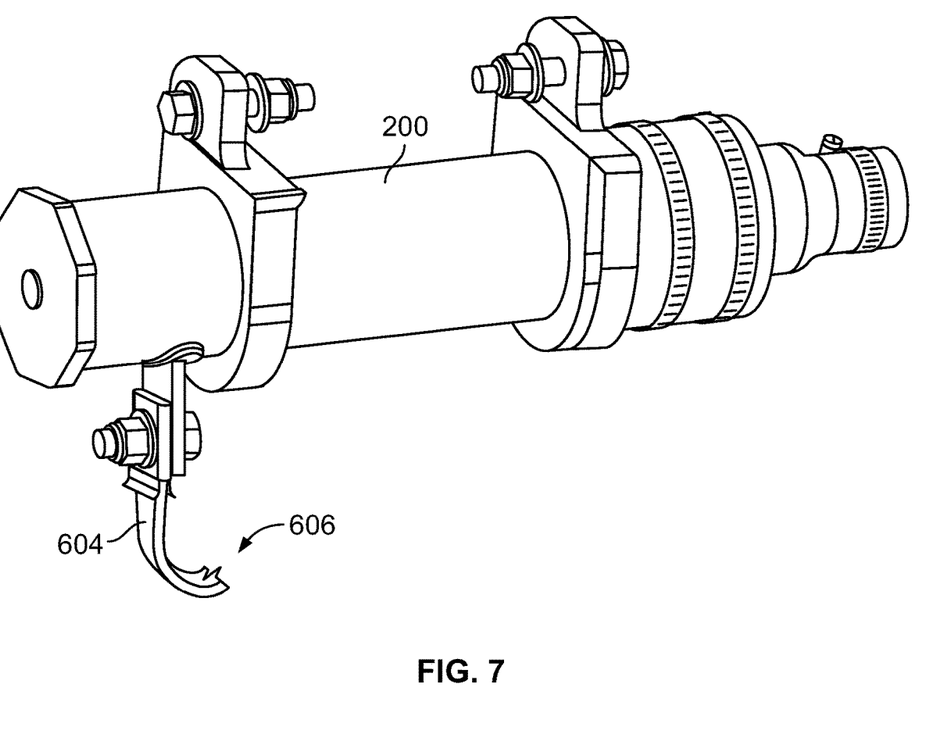
FIG. 7 illustrates the shunt link assembly shown in FIG. 6 at least partially separated from the powered system.

FIG. 6 illustrates a perspective view of another example of a shunt link assembly 600 mounted to the powered system. FIG. 7 illustrates the shunt link assembly at least partially separated from the powered system. The shunt link assembly shown in FIG. 6 conductively couples the current collector 100 with the component 200 so that current conducted into the current collector is conducted to the component via the shunt link assembly. The shunt link assembly includes shunts 602, 604 that are conductively coupled with each other in a series to conductively couple the current collector with the component. The shunt 604 may be a frangible shunt link in that the shunt 604 may be formed in a shape and/or formed from a material that structurally fails (e.g., breaks or tears) before the component is removed from the powered system. For example, the frangible shunt link 604 may break before the mounting of the component to the vehicle to interrupt a conductive pathway extending from the current collector, through the shunts 602, 604, and to the component. This can allow the force to remove the current collector 100 but prevent the force from removing the component 200 from the powered system. For example, the frangible shunt link can fail before the force imparted on the current collector becomes strong enough to separate the component from the powered system.

In one embodiment, the shunts 602, 604 are formed as braided conductive links or bodies. Alternatively, the shunts 602, 604 can be formed from solid, single-piece conductive bodies or bars. Two shunts 602, 604 (or more) can be used with the shunts joined together in a location 606 between the current collector and the component to direct the force experienced by the current collector to be focused into the location 606 to cause the shunt link 604 to tear at or near the location 606. The other shunt 602 may remain with the current collector that is separated from the powered system, as shown in FIG. 7.

Figure 8:
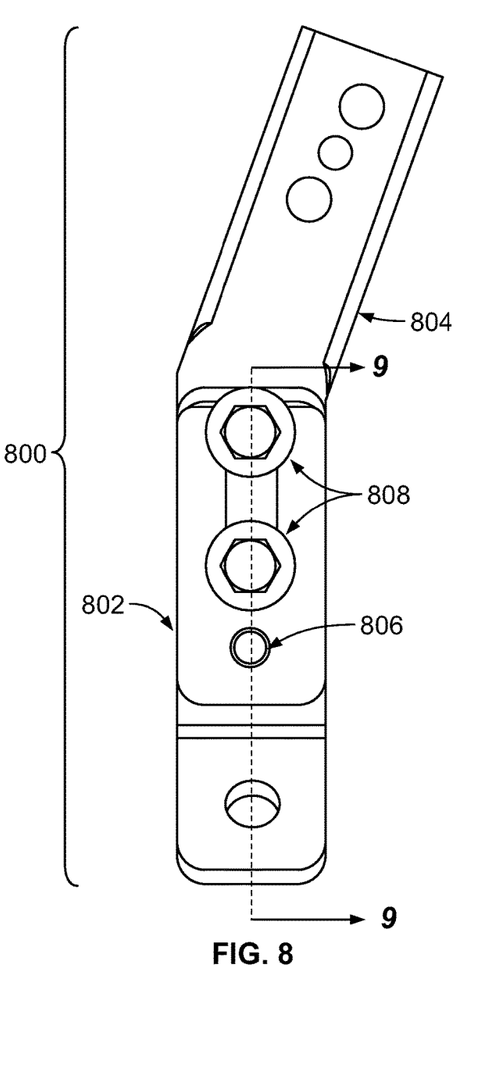
FIG. 8 illustrates a front view of another example of a shunt link assembly.
Figure 9:
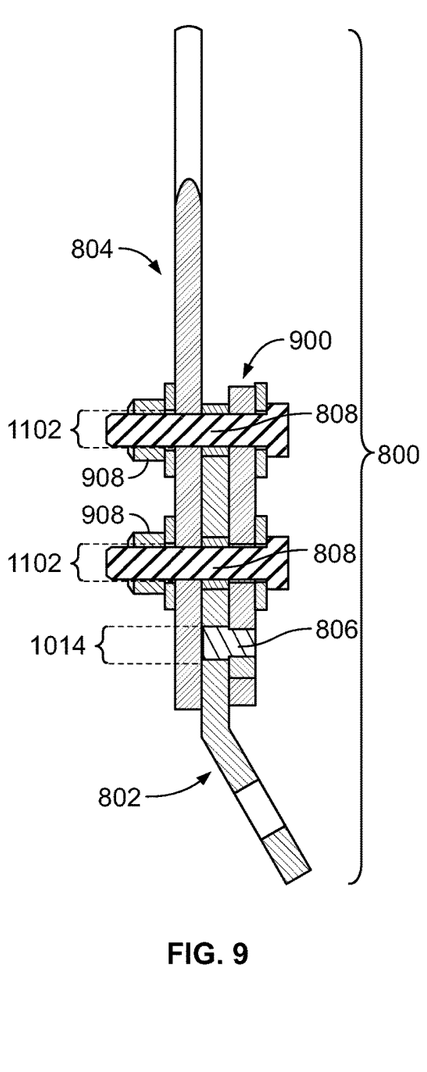
FIG. 9 illustrates a cross-sectional view of the shunt link assembly along line 9-9 in FIG. 8.

FIG. 8 illustrates a front view of another example of a shunt link assembly 800. FIG. 9 illustrates a cross-sectional view of the shunt link assembly 800 along line 9-9 in FIG. 8. The shunt link assembly 800 can be used in place of the shunt link assembly 10 and/or 600 described above. The shunt link assembly 800 can be formed from multiple conductive bodies 802, 804 and optionally a cap body 900 (shown in FIG. 9 but not shown in FIG. 8). Two or more of the bodies 802, 804, 900 can be held together by fasteners 808 and a frangible link 806. In one embodiment, the frangible link 806 is not conductive. Alternatively, the frangible link 806 may be conductive.

As described below, the shunt link assembly shown in FIGS. 8 and 9 operates by the frangible link 806 shearing or otherwise breaking upon receipt of a force on the current collector 100. This force can cause the collector 100 to at least partially separate from the powered system. The frangible link 806 can break, which allows the conductive body 802 that is coupled with the current collector 100 to separate from the other bodies 804 and/or 900 in the shunt link assembly. This separation can allow the current collector 100 to be separated from the powered system and the conductive connection between the current collector 100 and the powered system to be severed without pulling on or separating the component 200 from the powered system.

The conductive bodies 802, 804, 900 can held in contact with each other by fasteners 808, 908 and/or the frangible link 806 to create a conductive pathway through the shunt link assembly 800. In the illustrated embodiment, the bodies 802, 804, 900 are held together by the fasteners 808, 908 and the bodies 802, 900 are held together by the frangible link 806.

The conductive body 802 may be fastened (directly or indirectly) with the current collector 100 and the conductive body 804 may be fastened (directly or indirectly) with the component 200 of the powered system. The conductive bodies 802, 804 may be referred to as upstream and downstream conductive bodies, respectively, due to the direction and order in which current is conducted through the conductive bodies 802, 804 from the current collector 100 to the component 200. For example, the conductive body 802 may be conductively coupled with the current collector 100 such that current conducted into the current collector 100 from an electrified rail, catenary, or other source is conducted into the conductive body 802. The conductive body 802 conducts this current into the conductive body 804 due to the engagement of the conductive body 802 with the conductive body 804. The conductive body 804 is conductively coupled with the component 200 to conduct the current to the component 200.

The conductive bodies 802, 804 are held against each other such that the conductive bodies 802, 804 directly abut each other without any other bodies or materials between the conductive bodies 802, 804. In the example shown in FIG. 9, the cap body 900 may be positioned in the assembly such that at least part of the conductive body 802 is sandwiched between the cap body 900 and the conductive body 804. Alternatively, the cap body 900 may not be included in the assembly. Alternatively, the conductive bodies 802, 804 may have one or more intermediate bodies between the conductive bodies 802, 804, such as additional conductive bodies, coatings, or the like.

Figures 10, 11:
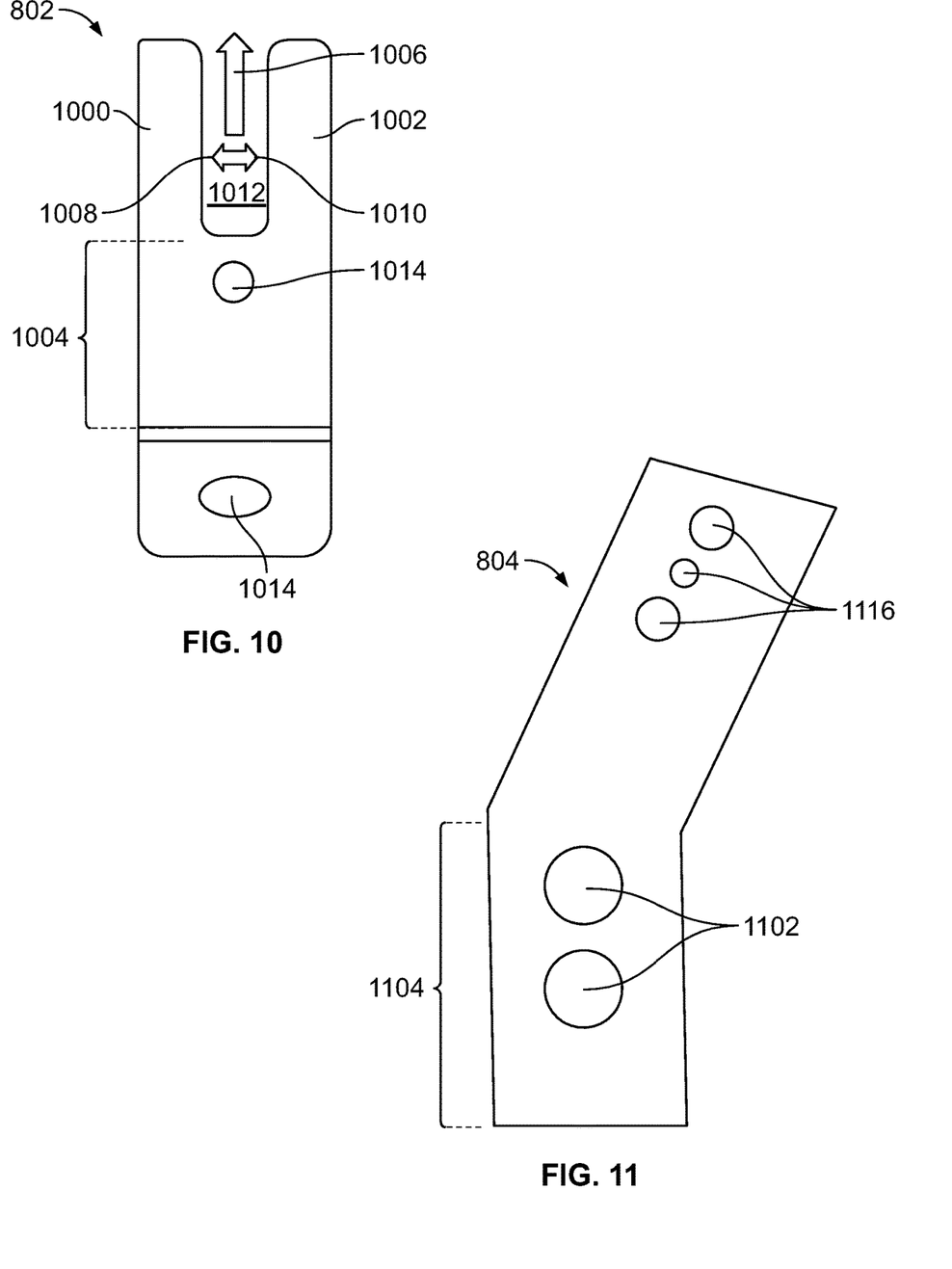
FIG. 10 illustrates a front view of one embodiment of a forked conductive body or shunt shown in FIG. 8.
FIG. 11 illustrates a front view of one embodiment of a conductive body or bus bar shown in FIG. 8.

FIG. 10 illustrates a front view of one embodiment of the conductive body 802 shown in FIG. 8. The conductive body 802 can be referred to as a forked shunt. The conductive body 802 can be forked in that the conductive body 802 includes elongated tines 1000, 1002 that protrude or extend from a common mating segment 1004 of the conductive body 802. The tines may be formed from a conductive material, such as the same conductive material as the mating segment 1004. The tines are elongated directions that are parallel to a release direction 1006. The tines are spaced apart from each other in lateral directions 1008, 1010 that are transverse (e.g., orthogonal) to the release direction 1006. This provides for an elongated spatial gap 1012 between the tines. The mating segment 1004 of the conductive body 802 also can include a link opening 1014. This link opening can be sized to receive the frangible link 806, as shown in FIG. 9.

A fastener opening 1016 of the conductive body 802 can receive a fastener or other connector to conductively couple the conductive body 802 with the current collector 100. For example, one or more buses, wires, cables, or the like, can be coupled with the conductive body 802 via the fastener opening 1016 or in another location.

FIG. 11 illustrates a front view of one embodiment of the conductive body 804 shown in FIG. 8. The conductive body 804 can be referred to as a bus bar. The conductive body 804 includes a mating segment 1104 that engages the mating segment 1004 of the conductive body 802 while the conductive bodies 802, 804 abut each other. The mating segment 1104 can be a flat body having fastener openings 1102 through which the fasteners 808 (shown in FIG. 8) may fit. The conductive body 804 also can include additional fastener openings 1116 that can receive fasteners or other connectors to conductively couple the conductive body 804 with the component 200. For example, one or more buses, wires, cables, or the like, can be coupled with the conductive body 804 via the fastener openings 1116 or in another location.

As shown in FIG. 9, the cap body 900 can include a link opening 914 sized to receive the frangible link 806. The frangible link 806 can be placed into the link openings 914, 1014 of the cap body 900 and the forked conductive body 802 such that the frangible link 806 is disposed within the thicknesses of the cap body 900 and the forked conductive body 802 at the same time. The frangible link 806 may not extend into the conductive body 804, as shown in FIG. 9. Alternatively, the conductive body 804 may include the link opening 914 and/or 1014 to receive part of the frangible link 806. For example, the frangible link 806 may extend through and be disposed within link openings in (a) the forked conductive body 802 and (b) at least one of the conductive body 804 and/or the cap body 900.

In operation, the current collector 100 may be pulled or otherwise at least partially separated from the powered system. This can pull on the forked conductive body 802 in a direction that is generally opposite that of the release direction 1006 (shown in FIG. 10). For example, the forked conductive body 802 may be pulled in a direction that is more opposite to the release direction 1006 than aligned in the same direction as the release direction. This pulling force can shear or otherwise break the frangible link 806. For example, the frangible link 806 may shear and be separated into multiple (e.g., two) parts along the interface between the forked conductive body 802 and the cap body 900. The cap body 900 can be rigidly fastened to the conductive body 804 such that the pulling force imparted on the forked conductive body 802 pulls the forked conductive body 802 out of the link assembly from between the conductive body 804 and the cap body 900. This can shear the link 806 such that the forked conductive body 802 is no longer held to the conductive body 804 and/or the cap body 900.

The fasteners 808 may move through the spatial gap 1012 between the tines 1000, 1002 of the forked conductive body 802 once the frangible link 806 is sheared and as the forked conductive body 802 is pulled in a direction that is generally opposite that of the release direction 1006. For example, as the forked conductive body 802 is pulled from between the conductive body 804 and the cap body 900, the fasteners 808 may exit from between the tines 1000, 1002 along the release direction 1006.

Figure 12:
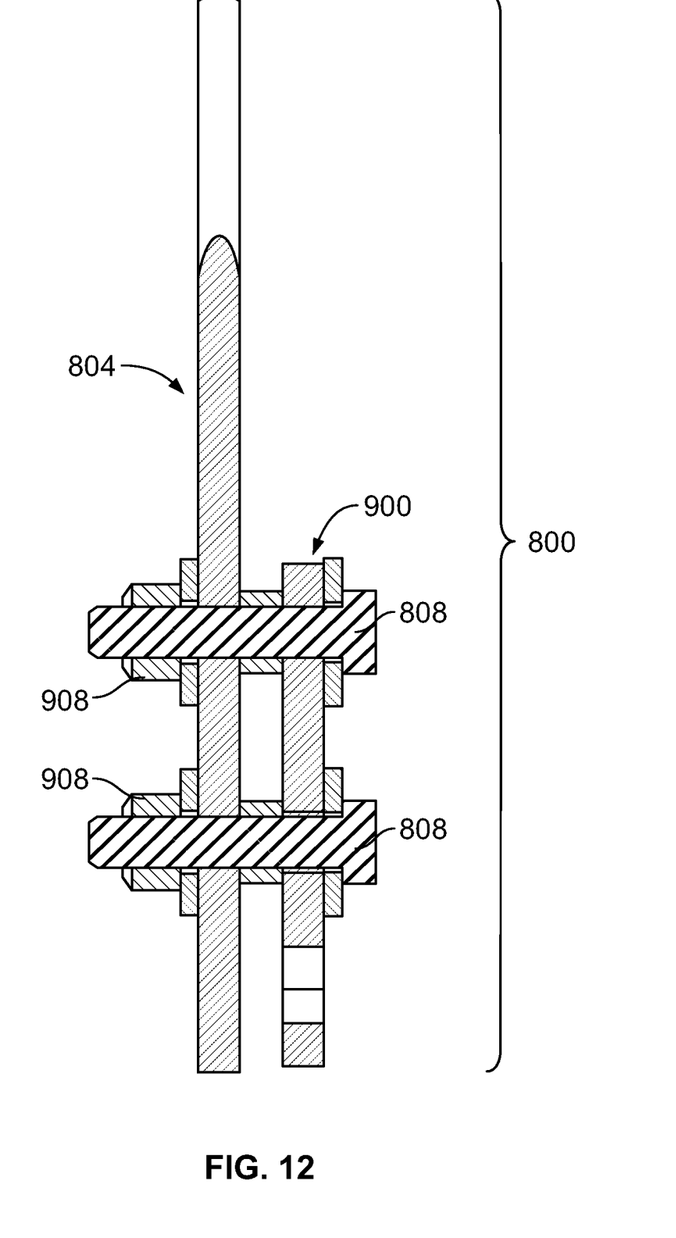
FIG. 12 illustrates the link assembly with the forked conductive body shown in FIG. 8 removed according to one example.

FIG. 12 illustrates the link assembly 800 shown in FIG. 8 with the forked conductive body 802 removed according to one example. As shown, the forked conductive body 802 has been removed from between the cap body 900 and the conductive body 800. The cap body 900 may remain coupled with the conductive body 804 by the fasteners 808, 908. The forked conductive body 802 is no longer mechanically or conductively coupled with the conductive body 804. The forked conductive body 802 is separated to sever the conductive pathway from the current collector 100 to the component 200 and to prevent the pulling force exerted on the forked conductive body 802 from pulling the component 200 at least partially off the powered system. The frangible link 806 can be formed from a material that shears at forces that are lower than a force needed to pull and at least partially separate the component 200 from the powered system. For example, the frangible link 806 may be formed from nylon.

In one example, a frangible shunt link assembly is provided that includes a current collector configured to be coupled with a vehicle and to engage a conductive pathway of a route on which the vehicle is moving. The current collector is configured to receive electric current from the conductive pathway. The assembly also includes a frangible link attached to the current collector and configured to be coupled with a fuse assembly of the vehicle to establish a conductive connection between the current collector and the fuse assembly. The frangible link is configured to break and interrupt the conductive connection between the current collector and the fuse assembly.

Optionally, the frangible link is configured to break and interrupt the conductive connection between the current collector and the fuse assembly responsive to the current collector being at least partially separated from the vehicle.

Optionally, the frangible link is configured to break and interrupt the conductive connection between the current collector and the fuse assembly responsive to the current collector being at least partially separated from the vehicle while the fuse assembly remains coupled with the vehicle.

Optionally, the frangible link is conductive and forms at least part of the conductive connection between the current collector and the fuse assembly.

Optionally, the frangible link comprises a braided shunt.

Optionally, the frangible link comprises a fuse bus bar configured to be conductively coupled with the fuse assembly, a shunt bus bar configured to be conductively coupled with the current collector and having a detent on an external surface of the shunt bus bar, and a wedge link configured to be conductively coupled with the fuse assembly. The wedge link can include a deformable portion and a detent receiver in the deformable portion, the detent receiver shaped to receive the detent of the shunt bus bar. The shunt bus bar can be held in a clamped engagement between the wedge link and the fuse bus bar and conductively coupling the shunt bus bar and the fuse bus bar. The deformable portion of the wedge link can be configured to break and interrupt the conductive connection between the current collector and the fuse assembly.

Optionally, the conductive connection between the current collector and the fuse assembly includes multiple conductive bodies. The frangible link can include a non-conductive body that couples the multiple conductive bodies of the conductive connection together.

Optionally, the non-conductive body of the frangible link can be configured to no longer couple the multiple conductive bodies of the conductive connection with each other when the non-conductive body breaks.

Optionally, the multiple conductive bodies can include a bus bar conductively coupled with the fuse assembly and a forked shunt conductively coupled with the current collector.

Optionally, the bus bar and the forked shunt can be fastened together by one or more fasteners and the frangible link is a shear pin extending through the bus bar and the forked shunt.

Optionally, the forked shunt includes conductive tines with the one or more fasteners located between the conductive tines such that, responsive to the shear pin breaking, the forked shut can be configured to separate from the bus bar with the one or more fasteners moving between the conductive tines to separate the bus bar from the forked shunt.

Optionally, the frangible link is configured to break responsive to receiving a force that is too small to separate the fuse assembly of the vehicle from the vehicle.

In another example, a vehicle includes the frangible shunt link assembly with the fuse assembly mounted to an external surface of the vehicle, and the frangible link coupled with the fuse assembly and the current collector.

In another example of a frangible shunt link assembly, the assembly includes a current collector configured to be coupled with a vehicle and to engage a conductive pathway of a route on which the vehicle is moving. The current collector is configured to receive electric current from the conductive pathway. The assembly also includes a frangible link attached to the current collector and configured to be coupled with one or more components of the vehicle. The frangible link is configured to break and interrupt a conductive connection between the current collector and the one or more components of the vehicle.

Optionally, the frangible link is configured to break and interrupt the conductive connection between the current collector and the one or more components of the vehicle responsive to the current collector being at least partially separated from the vehicle.

Optionally, the frangible link is conductive and forms at least part of the conductive connection between the current collector and the one or more components of the vehicle.

Optionally, the frangible link comprises a braided shunt.

Optionally, the frangible link comprises a first bus bar configured to be conductively coupled with the one or more components of the vehicle, a second bus bar configured to be conductively coupled with the current collector and having a detent on an external surface of the second bus bar, and a wedge link configured to be conductively coupled with the one or more components of the vehicle. The wedge link can include a deformable portion and a detent receiver in the deformable portion. The detent receiver can be shaped to receive the detent of the second bus bar. The second bus bar can be held in a clamped engagement between the wedge link and the first bus bar and conductively coupling the first bus bar and the second bus bar. The deformable portion of the wedge link can be configured to break and interrupt the conductive connection between the current collector and the one or more components of the vehicle.

Optionally, the conductive connection between the current collector and the one or more components of the vehicle comprises a bus bar configured to be conductively coupled with the one or more components of the vehicle, a forked shunt conductively coupled with the current collector and configured to be coupled with the bus bar by one or more fasteners, and a shear pin extending through and coupling the bus bar and the forked shunt, the shear pin configured to break responsive to the current collector being at least partially separated from the vehicle. Responsive to the shear pin breaking, the forked shut can separate from the bus bar with the one or more fasteners moving between tines of the forked shunt to separate the bus bar from the forked shunt.

In another example of the frangible shunt link assembly, the assembly includes a frangible link configured to conductively couple a current collector coupled with a vehicle and one or more components of the vehicle. The frangible link is configured to break responsive to the current collector being at least partially separated from the vehicle to interrupt a conductive connection between the current collector and the one or more components of the vehicle.

Optionally, the frangible link is configured to break responsive to receiving a force that is too small to separate the one or more components of the vehicle from the vehicle.

Optionally, the frangible link is conductive.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
   a current collector configured to be coupled with a vehicle and to engage a conductive pathway of a route on which the vehicle is moving, the current collector configured to receive electric current from the conductive pathway; and
   a frangible link attached to the current collector and configured to be coupled with a fuse assembly of the vehicle to establish a conductive connection between the current collector and the fuse assembly;
   wherein the frangible link is configured to break and interrupt the conductive connection between the current collector and the fuse assembly.

2. The assembly of claim 1, wherein the frangible link is configured to break and interrupt the conductive connection between the current collector and the fuse assembly responsive to the current collector being at least partially separated from the vehicle.

3. The assembly of claim 2, wherein the frangible link is configured to break and interrupt the conductive connection between the current collector and the fuse assembly responsive to the current collector being at least partially separated from the vehicle while the fuse assembly remains coupled with the vehicle.

4. The assembly of claim 1, wherein the frangible link is conductive and forms at least part of the conductive connection between the current collector and the fuse assembly.

5. The assembly of claim 4, wherein the frangible link comprises a braided shunt.

6. The assembly of claim 4, wherein the frangible link comprises:
   a fuse bus bar configured to be conductively coupled with the fuse assembly;
   a shunt bus bar configured to be conductively coupled with the current collector and having a detent on an external surface of the shunt bus bar; and
   a wedge link configured to be conductively coupled with the fuse assembly, the wedge link including a deformable portion and a detent receiver in the deformable portion, the detent receiver shaped to receive the detent of the shunt bus bar,
   the shunt bus bar held in a clamped engagement between the wedge link and the fuse bus bar and conductively coupling the shunt bus bar and the fuse bus bar, the deformable portion of the wedge link configured to break and interrupt the conductive connection between the current collector and the fuse assembly.

7. The assembly of claim 1, wherein the conductive connection between the current collector and the fuse assembly includes multiple conductive bodies, the frangible link including a non-conductive body that couples the multiple conductive bodies of the conductive connection together.

8. The assembly of claim 7, wherein the non-conductive body of the frangible link is configured to no longer couple the multiple conductive bodies of the conductive connection with each other when the non-conductive body breaks.

9. The assembly of claim 8, wherein the multiple conductive bodies include a bus bar conductively coupled with the fuse assembly and a forked shunt conductively coupled with the current collector.

10. The assembly of claim 9, wherein the bus bar and the forked shunt are fastened together by one or more fasteners and the frangible link is a shear pin extending through the bus bar and the forked shunt.

11. The assembly of claim 10, wherein the forked shunt includes conductive tines with the one or more fasteners located between the conductive tines such that, responsive to the shear pin breaking, the forked shunt configured to separate from the bus bar with the one or more fasteners moving between the conductive tines to separate the bus bar from the forked shunt.

12. The assembly of claim 1, wherein the frangible link is configured to break responsive to receiving a force that is too small to separate the fuse assembly of the vehicle from the vehicle.

13. A vehicle comprising: the assembly of claim 1, wherein the fuse assembly is mounted to an external surface of the vehicle, and the frangible link is coupled with the fuse assembly and the current collector.

14. An assembly comprising:
a current collector configured to be coupled with a vehicle and to engage a conductive pathway of a route on which the vehicle is moving, the current collector configured to receive electric current from the conductive pathway; and
a conductive frangible link attached to the current collector and configured to be coupled with one or more components of the vehicle to form at least part of a conductive connection between the current collector and the one or more components of the vehicle,
wherein the frangible link is configured to break and interrupt the conductive connection between the current collector and the one or more components of the vehicle.

15. The assembly of claim 14, wherein the frangible link is configured to break and interrupt the conductive connection between the current collector and the one or more components of the vehicle responsive to the current collector being at least partially separated from the vehicle.

16. The assembly of claim 14, wherein the frangible link comprises a braided shunt.

17. The assembly of claim 14, wherein the frangible link comprises:
a first bus bar configured to be conductively coupled with the one or more components of the vehicle;
a second bus bar configured to be conductively coupled with the current collector and having a detent on an external surface of the second bus bar; and
a wedge link configured to be conductively coupled with the one or more components of the vehicle, the wedge link including a deformable portion and a detent receiver in the deformable portion, the detent receiver shaped to receive the detent of the second bus bar,
the second bus bar held in a clamped engagement between the wedge link and the first bus bar and conductively coupling the first bus bar and the second bus bar, the deformable portion of the wedge link configured to break and interrupt the conductive connection between the current collector and the one or more components of the vehicle.

18. The assembly of claim 14, wherein the conductive connection between the current collector and the one or more components of the vehicle comprises:
a bus bar configured to be conductively coupled with the one or more components of the vehicle;
a forked shunt conductively coupled with the current collector and configured to be coupled with the bus bar by one or more fasteners; and
a shear pin extending through and coupling the bus bar and the forked shunt, the shear pin configured to break responsive to the current collector being at least partially separated from the vehicle,
wherein, responsive to the shear pin breaking, the forked shunt separates from the bus bar with the one or more fasteners moving between tines of the forked shunt to separate the bus bar from the forked shunt.

19. An assembly comprising:
a conductive frangible link configured to conductively couple a current collector coupled with a vehicle and one or more components of the vehicle while the vehicle is moving along a route, the frangible link configured to break responsive to the current collector being at least partially separated from the vehicle to interrupt a conductive connection between the current collector and the one or more components of the vehicle.

20. The assembly of claim 19, wherein the frangible link is configured to break responsive to receiving a force that is too small to separate the one or more components of the vehicle from the vehicle.

* * * * *